UNITED STATES PATENT OFFICE.

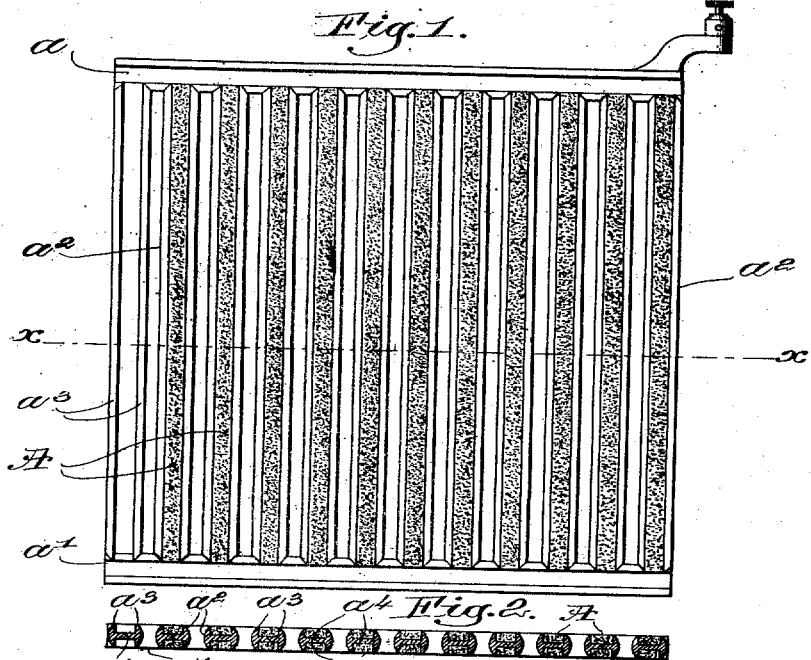
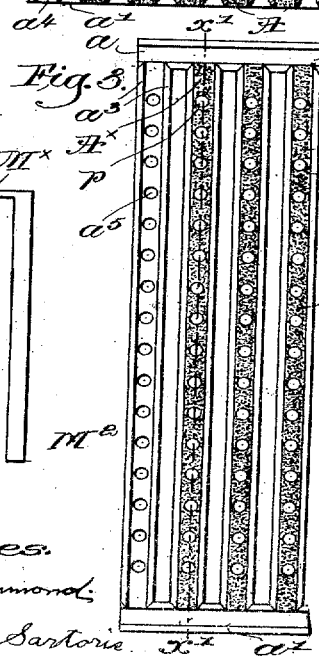
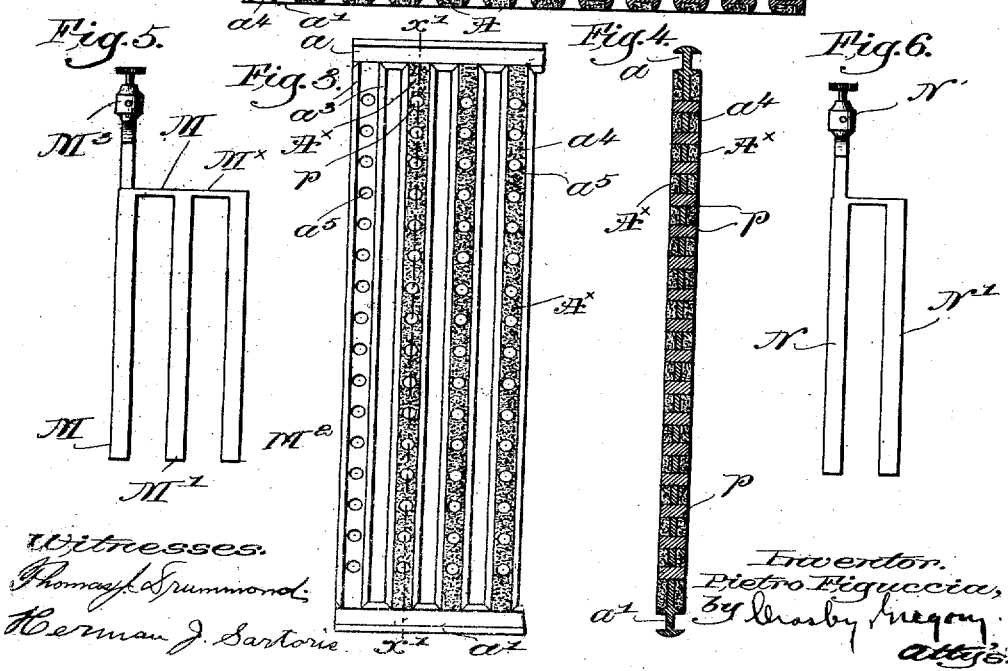
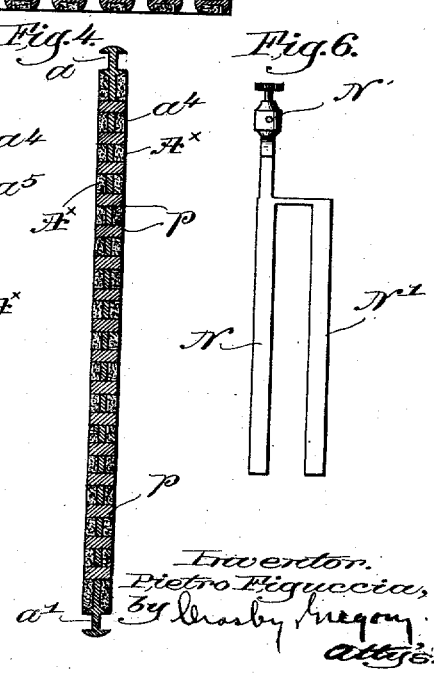

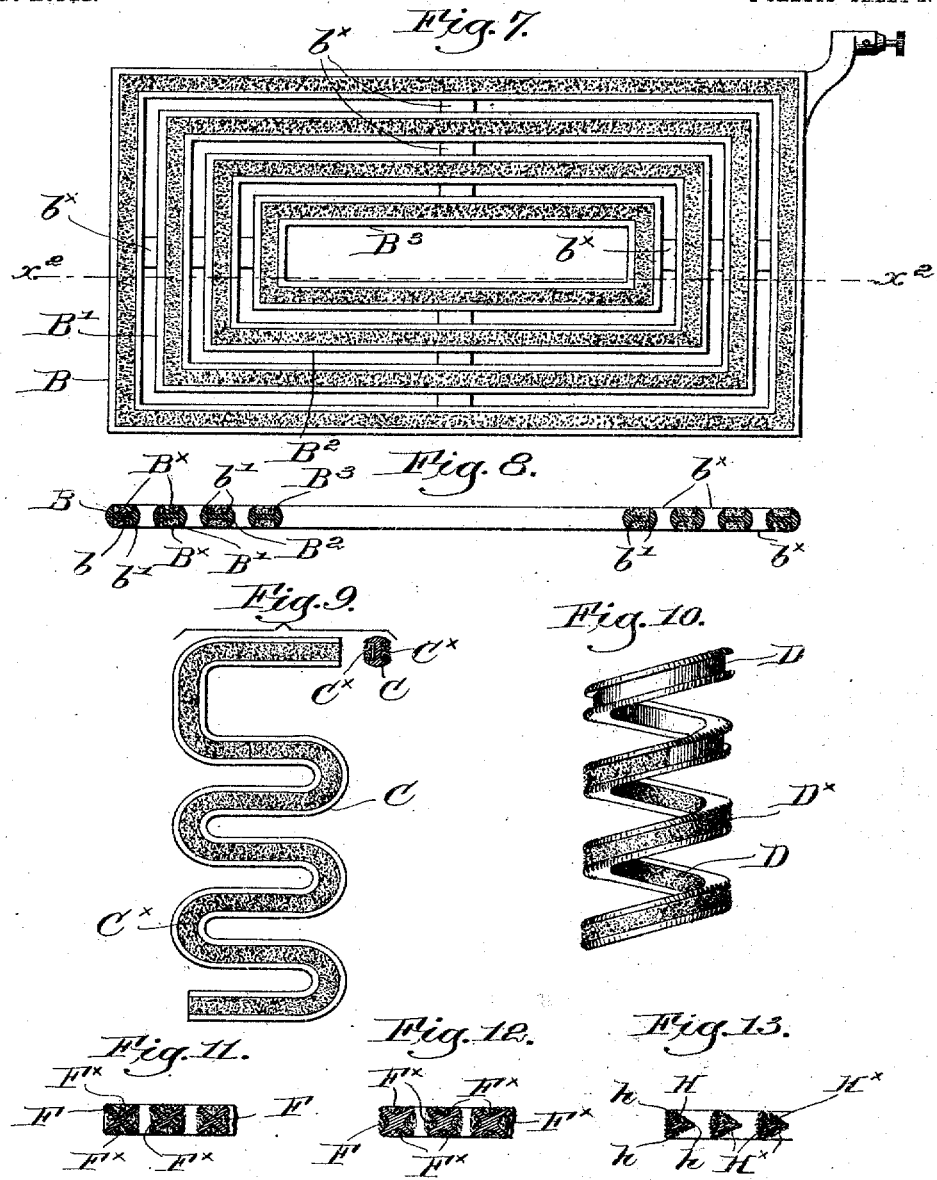

PIETRO FIGUCCIA, OF BOSTON, MASSACHUSETTS, ASSIGNOR TO LOUIS MELANO ROSSI, OF BOSTON, MASSACHUSETTS.

SECONDARY BATTERY.

SPECIFICATION forming part of Letters Patent No. 726,274, dated April 28, 1903.

Application filed May 22, 1902. Serial No. 108,488. (No model.)

*To all whom it may concern:*

Be it known that I, PIETRO FIGUCCIA, a subject of the King of Italy, and a resident of Boston, county of Suffolk, State of Massachusetts, have invented an Improvement in Secondary Batteries, of which the following description, in connection with the accompanying drawings, is a specification, like letters on the drawings representing like parts.

This invention relates to secondary batteries, and more particularly to the construction of the means for retaining the active material in pasty or other form—such, for instance, as lead oxid used as electrodes in such batteries.

One of the objects of my invention is to decrease the weight of the battery while employing a maximum quantity of active material; and another object of my invention is to support or dispose such active material in the most efficient manner.

The great objection to the use of secondary batteries for many purposes is due to the excessive weight thereof compared with the capacity, and in my present invention I have very greatly decreased the weight, while at the same time I have secured a most efficient disposition of the active material.

The various novel features of my invention will be hereinafter described, and particularly pointed out in the following claims.

Figure 1 is a side elevation of a grid or frame embodying one form of my invention, showing the active material supported thereby. Fig. 2 is a cross-section thereof on the line $x\ x$, Fig. 1. Fig. 3 is a side elevation of a portion of a modified form of grid or frame, to be described. Fig. 4 is a vertical section thereof on the line $x'\ x'$, Fig. 3. Fig. 5 is an end view of one form of positive element made up of a plurality of frames or grids, such as shown in Fig. 1. Fig. 6 is a similar view of the negative element. Fig. 7 is a side elevation of yet another modification of my invention, to be described. Fig. 8 is a transverse section thereof on the line $x^2\ x^2$, Fig. 7. Figs. 9 and 10 are details showing different ways in which the active material may be supported. Figs. 11, 12, and 13 are transverse sectional details showing different cross-sectional forms of supporting-bars for retaining the active material of the battery.

In carrying out my invention I make the frame or grid preferably of lead or an alloy in which lead forms the principal element, and, referring to Figs. 1 and 2, the grid comprises top and bottom bars $a\ a'$, connected by a series of parallel juxtaposed bars $a^2$, the grid being preferably made as a casting. The bars $a^2$ are made as double-channel bars, the longitudinal channels $a^3$ on each side of the connecting-web $a^4$ forming long channels or troughs on opposite faces of the frame, into which the active material A in pasty or pulverulent condition is compressed or packed. As shown, the webs $a^4$ of the series of bars are located in the same plane, so that the element when ready for use presents on its opposite faces a series of elongated columns or masses of active material separated from each other.

In order to secure the requisite stiffness, combined with light weight, the top and bottom members $a\ a'$ of the frame may be made substantially like the supporting-bars $a^2$ in cross-section, with their channels on the front and back of the frame, and they may be filled with the active material, if desired. The channel form adopted gives great strength and rigidity to the frame, combined with relatively light weight, and at the same time provides for the support of a very large proportion of active material in separated masses in order to secure the greatest efficiency.

In the modification shown in Figs. 3 and 4 the frame or grid is made in substantially the manner described; but the webs $a^4$ of the supporting-bars are provided with holes $a^5$, in which plugs $p$, of peroxid of manganese, are inserted, extending into the opposite channels, and the active material $A^\times$ is packed in around the plugs, the peroxid acting to increase the amperage of the battery.

Referring to Fig. 5, a set of three of the grids or frames, as M M' M², are electrically connected by a union M$^\times$, provided with a suitable binding-screw M², and form the positive electrode, the negative electrode (shown in Fig. 6) having two connected frames or grids N N' and a binding-screw N$^\times$.

Referring to Figs. 7 and 8, the grid is shown as composed of a series of double-channel bars B B' B² &c., shown as open rectangles of gradually-decreasing size and nested one within the other, each bar having its web $b$ in the same plane and with the ribs $b'$ on opposite sides to constitute the channels for holding the active material B×.

In casting the grid the rectangular channel members are connected at suitable intervals by bridges $b^×$ of the metal; but it will be observed that the masses of active material at opposite faces of the frame are maintained separated from each other, as before.

Referring to Fig. 9, the supporting-bar C is made of the double-channel type; but it is bent or waved to present a series of parallel portions connected by the bends, the active material C× being held in the serpentine channels on the opposite faces of the member C.

In Fig. 10 the supporting-bar is made in the shape of a spiral, the active material D× being supported on both inner and outer faces of the spiral double-channeled member D. Manifestly the channeling of the supporting members for the active material may be made of different cross-section, and in Figs. 11, 12, and 13 I have shown some of such forms.

In Figs. 11 and 12 the members F each present four channels, one on each of the outer faces of the grid and opposite channels facing adjacent channels of the next successive bars F, so that each bar is capable of supporting four column-like masses F× of active material, it being understood that the bars will be arranged in parallelism to form a grid or frame substantially such as shown in Fig. 1.

A different cross-section is shown in Fig. 13, wherein the bars H present three radial ribs $h$ to constitute a like number of V-shaped channels for the active material H×.

The shapes and proportions of the channels of the supporting-bars may be varied in many different ways; but the active or electrode material will in all cases be supported in separated column-like masses, each bar of the grid or frame sustaining a plurality of such masses separated from each other by the material of the bar.

Having fully described my invention, what I claim as new, and desire to secure by Letters Patent, is—

1. In a secondary battery, a grid or frame comprising a series of juxtaposed and laterally-separated bars each having a channel in its opposite outer faces, and masses of active material retained in the channels of the bars, the spaces between the latter being left open and unobstructed.

2. In a secondary battery, a lead grid or frame comprising head and foot members and a series of laterally-separated, channeled supports for the active material, and connected at their ends with said head and foot members, each support having a plurality of channels separated from each other, and located at the outer faces of the grid, to maintain the masses of active material separated, with open spaces between each contiguous pair of supports.

3. In a secondary battery, a lead frame or grip comprising a series of double-channel bars arranged in parallelism and having their webs provided with openings, plugs of peroxid of manganese extended through the openings, and active material molded into the opposite channels of said bars and about the projecting ends of said plugs.

4. In a secondary battery, a leaden support for the active material, having an elongated perforated web and parallel, oppositely-extended flanges thereon to present trough-like channels on opposite sides of said support, the perforations in the web connecting opposite channels.

In testimony whereof I have signed my name to this specification in the presence of two subscribing witnesses.

PIETRO FIGUCCIA.

Witnesses:
 L. MELANO ROSSI,
 CHAS. F. MILLER.

---

It is hereby certified that in Letters Patent No. 726,274, granted April 28, 1903, upon the application of Pietro Figuccia, of Boston, Massachusetts, for an improvement in "Secondary Batteries," an error appears in the printed specification requiring correction, as follows: In line 72, page 2, the word "grip" should read *grid*; and that the said Letters Patent should be read with this correction therein that the same may conform to the record of the case in the Patent Office.

Signed and sealed this 12th day of May, A. D., 1903.

[SEAL.]

F. I. ALLEN,
*Commissioner of Patents.*

Referring to Figs. 7 and 8, the grid is shown as composed of a series of double-channel bars B B' B², &c., shown as open rectangles of gradually-decreasing size and nested one within the other, each bar having its web $b$ in the same plane and with the ribs $b'$ on opposite sides to constitute the channels for holding the active material B×.

In casting the grid the rectangular channel members are connected at suitable intervals by bridges $b^×$ of the metal; but it will be observed that the masses of active material at opposite faces of the frame are maintained separated from each other, as before.

Referring to Fig. 9, the supporting-bar C is made of the double-channel type; but it is bent or waved to present a series of parallel portions connected by the bends, the active material C× being held in the serpentine channels on the opposite faces of the member C.

In Fig. 10 the supporting-bar is made in the shape of a spiral, the active material D× being supported on both inner and outer faces of the spiral double-channeled member D. Manifestly the channeling of the supporting members for the active material may be made of different cross-section, and in Figs. 11, 12, and 13 I have shown some of such forms.

In Figs. 11 and 12 the members F each present four channels, one on each of the outer faces of the grid and opposite channels facing adjacent channels of the next successive bars F, so that each bar is capable of supporting four column-like masses F× of active material, it being understood that the bars will be arranged in parallelism to form a grid or frame substantially such as shown in Fig. 1.

A different cross-section is shown in Fig. 13, wherein the bars H present three radial ribs $h$ to constitute a like number of V-shaped channels for the active material H×.

The shapes and proportions of the channels of the supporting-bars may be varied in many different ways; but the active or electrode material will in all cases be supported in separated column-like masses, each bar of the grid or frame sustaining a plurality of such masses separated from each other by the material of the bar.

Having fully described my invention, what I claim as new, and desire to secure by Letters Patent, is—

1. In a secondary battery, a grid or frame comprising a series of juxtaposed and laterally-separated bars each having a channel in its opposite, outer faces, and masses of active material retained in the channels of the bars, the spaces between the latter being left open and unobstructed.

2. In a secondary battery, a lead grid or frame comprising head and foot members and a series of laterally-separated, channeled supports for the active material, and connected at their ends with said head and foot members, each support having a plurality of channels separated from each other, and located at the outer faces of the grid, to maintain the masses of active material separated, with open spaces between each contiguous pair of supports.

3. In a secondary battery, a lead frame or grip comprising a series of double-channel bars arranged in parallelism and having their webs provided with openings, plugs of peroxid of manganese extended through the openings, and active material molded into the opposite channels of said bars and about the projecting ends of said plugs.

4. In a secondary battery, a leaden support for the active material, having an elongated perforated web and parallel, oppositely-extended flanges thereon to present trough-like channels on opposite sides of said support, the perforations in the web connecting opposite channels.

In testimony whereof I have signed my name to this specification in the presence of two subscribing witnesses.

PIETRO FIGUCCIA.

Witnesses:
 L. MELANO ROSSI,
 CHAS. F. MILLER.

---

It is hereby certified that in Letters Patent No. 726,274, granted April 28, 1903, upon the application of Pietro Figuccia, of Boston, Massachusetts, for an improvement in "Secondary Batteries," an error appears in the printed specification requiring correction, as follows: In line 72, page 2, the word "grip" should read *grid;* and that the said Letters Patent should be read with this correction therein that the same may conform to the record of the case in the Patent Office.

Signed and sealed this 12th day of May, A. D., 1903.

[SEAL.]

F. I. ALLEN,
*Commissioner of Patents.*

It is hereby certified that in Letters Patent No. 726,274, granted April 28, 1903, upon the application of Pietro Figuccia, of Boston, Massachusetts, for an improvement in "Secondary Batteries," an error appears in the printed specification requiring correction, as follows: In line 72, page 2, the word "grip" should read *grid;* and that the said Letters Patent should be read with this correction therein that the same may conform to the record of the case in the Patent Office.

Signed and sealed this 12th day of May, A. D., 1903.

[SEAL.]

F. I. ALLEN,
*Commissioner of Patents.*